(12) United States Patent
Han

(10) Patent No.: US 6,388,763 B1
(45) Date of Patent: May 14, 2002

(54) METHOD FOR PROCESSING A ROM IMAGE WHEN ELECTRICAL POWER SUPPLIED TO A LASER PRINTER HAS BEEN INTERRUPTED

(75) Inventor: Ho-sung Han, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/187,922

(22) Filed: Nov. 6, 1998

(30) Foreign Application Priority Data

Nov. 6, 1997 (KR) .............................. 97-58299

(51) Int. Cl.$^7$ .............................................. G06K 15/00
(52) U.S. Cl. ....................................... 358/1.16; 358/1.1
(58) Field of Search ................................. 358/1.1, 1.13, 358/1.14, 1.16, 1.17, 449, 261.4, 413, 462, 437, 467, 426, 430, 444, 404, 405; 400/61, 62, 70

(56) References Cited

U.S. PATENT DOCUMENTS

| 5,926,373 A | 5/1990 | Takenaka |
| 5,018,081 A | 5/1991 | Yamaguchi et al. |
| 5,083,286 A * | 1/1992 | Hino et al. ................. 358/1.16 |
| 5,131,077 A | 7/1992 | Indei |
| 5,195,176 A | 3/1993 | Lung |
| 5,420,667 A | 5/1995 | Kaneko et al. |
| 5,473,735 A | 12/1995 | Murakami |
| 5,495,559 A | 2/1996 | Makino |
| 5,504,669 A | 4/1996 | Wakabayashi et al. |
| 5,550,958 A | 8/1996 | Hattori |
| 5,784,174 A | 7/1998 | Fujino et al. |
| 5,812,745 A | 9/1998 | Kim et al. |
| 5,822,505 A * | 10/1998 | Okada ....................... 358/1.14 |

* cited by examiner

Primary Examiner—Arthur G. Evans
(74) Attorney, Agent, or Firm—Robert E. Bushnell, Esq.

(57) ABSTRACT

In a technique for processing a ROM image when supplying of electrical power to a laser printer has been interrupted during the downloading of the ROM image to a flash memory, if the ROM image is abnormally downloaded to the flash memory, the ROM image can be loaded into the flash memory again. Accordingly, although the ROM image is abnormally loaded into the flash memory in the laser printer, it is possible to normally use the laser printer.

28 Claims, 7 Drawing Sheets

FIG. 7

| Sector numbers | 0 | 1 | 2 | 3 | 4 | 5 | 6 | 7 | 8 |
|---|---|---|---|---|---|---|---|---|---|
| It is determined whether or not a change is presented | NON-ERASABLE | 0 | 0 | 0 | 1 | 0 | 0 | 0 | 1 |

~17

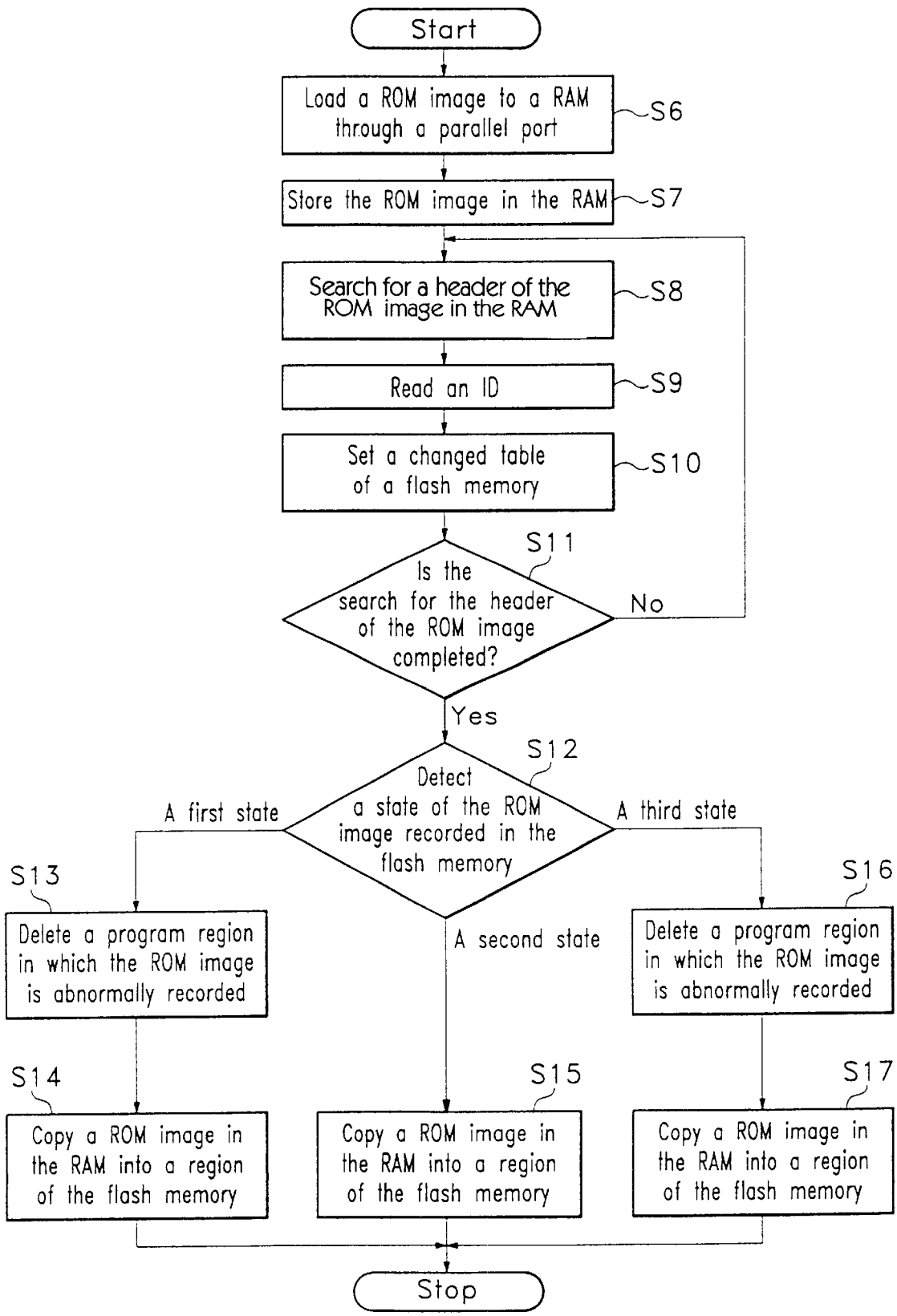

METHOD FOR PROCESSING A ROM IMAGE WHEN ELECTRICAL POWER SUPPLIED TO A LASER PRINTER HAS BEEN INTERRUPTED

CLAIM OF PRIORITY

This application makes reference to, incorporates the same herein, and claims all benefits accruing under 35 U.S.C. §119 from an application for A METHOD FOR PROCESSING A ROM IMAGE WHEN A SUPPLYING OF AN ELECTRIC POWER TO A LASER PRINTER IS INTERRUPTED earlier filed in the Korean Industrial Property Office on Nov. 6, 1997 and there duly assigned Serial No. 58299/1997.

BACKGROUND OF THE INVENTION

1. Field of the Invention

The present invention relates to a technique for processing an ROM image, and more particularly to a technique for processing an ROM image when electrical power supplied to a laser printer has been interrupted.

2. Description of the Related Art

Generally, a laser printer performs accurate operations and communicates with a computer. Moreover, the laser printer has various functions because of supplying of emulation modes such as KSSM, PCL, and the like. Thus, the laser printer has a separate microprocessor mounted therein to perform printing according under the control of a bios which is stored in a ROM. In general, the bios is stored in a one time programmable ROM or an erasable and programmable ROM (hereinafter, referred to as an EPROM). The ROM in which the bios is stored is not damaged as long as a physical impact is not applied to the ROM and the recorded data is preserved even if the supplying of electrical power is interrupted.

As described above, according to the present invention, the ROM image can be freely read from and written in the flash memory which preserves the recorded data even if the supplying of electrical power is interrupted. With bugs found in the bios are corrected or the bios is upgraded after the product and sale of the laser printer, the user can obtain the corrected bios or the upgraded bios from a manufacturer through a communication line or an internet site so as to replace the bios having bugs or the old version of the bios with the corrected bios or the new version of the bios. Accordingly, a reliability of the product can be increased.

An earlier Korean patent application discloses a method of downloading a ROM image to a flash memory of a laser printer.

According to the above patent application, the laser printer has a function of downloading the ROM image and is provided with a RAM and the flash memory. The laser printer has the ROM image which is downloaded from a computer through a parallel port and stores the ROM image in the RAM. When a header is searched for and found in the ROM image, an ID field is read from the header. A flash memory changing table is set for a sector to be changed according to the ID field. Then, recorded data is deleted from the sector of the flash memory and the ROM image which is stored in the RAM is copied in the sector of the flash memory.

However, the Korean patent application discloses the method of downloading the ROM image to the flash memory of the laser printer only when electric power is normally supplied to the laser printer.

In a case when the program which is recorded in the bios area of the flash memory is deleted in order that the laser printer performs the downloading of the ROM image to the flash memory thereof, upon the supplying of electrical power to the laser printer being interrupted, the program which is recorded in the boot area is, in part, deleted. Accordingly, even though electrical power is supplied to the laser printer, the laser printer cannot be operated because the program in the boot area cannot be performed due to the partial damage in spite of jumping a jump code in the boot area to the bios.

In a case of the supplying of electrical power to the laser printer being interrupted before the bios ROM image in the RAM is copied to the flash memory after the program which is recorded in the bios area of the flash memory is deleted, even though electrical power is again supplied to the laser printer, the laser printer cannot be operated because the data which is recorded in the bios area has been deleted in spite of jumping the jump code in the boot area to the bios.

Moreover, in a case of supplying of electrical power to the laser printer has been interrupted during copying of the bios ROM image from the RAM to the bios area of the flash memory after the program which is recorded in the bios area of the flash memory is deleted, even though electrical power is supplied to the laser printer again, the laser printer cannot be normally operated because the ROM image has been abnormally downloaded to the bios area in spite of jumping the jump code in the boot area to the bios.

The following patents each discloses features in common with the present invention but do not teach or suggest the specifically recited technique for processing a ROM image when electrical power supplied to a laser printer has been interrupted: U.S. Pat. No. 5,812,745 to Kim et al., entitled Image Forming Apparatus, U.S. Pat. No. 5,784,174 to Fujino et al., entitled Method For Managing Memory Data At Power-Up, U.S. Pat. No. 5,473,735 to Murakami, entitled Page Printer, U.S. Pat. No. 5,420,667 to Kaneko et al., entitled Communication Control Apparatus For Monitoring A condition Of An Image Forming Apparatus And Inhibiting Transmission Of Data When A Power Supply Means Is Turned Off, U.S. Pat. No. 5,018,081 to Yamaguchi et al., entitled Printer With Automatic Restart, U.S. Pat. No. 5,131,077 to Indei, entitled Backup System For Printer Control Device, U.S. Pat. No. 4,926,373 to Takenaka, entitled Word Processor For Selecting A Control Program Stored IN The Word Processor When A Control Program In An Externally Detachable Memory Is Not Able To Be Read, U.S. Pat. No. 5,504,669 to Wakabayashi et al., entitled Information Processing Device And Accessory Control Device, U.S. Pat. No. 5,550,958 to Hattori, entitled Printer With Extension Memory Capacity That Provides Instructions Regarding Memory Installation, and U.S. Pat. No. 5,195,176 to Lung, entitled Method And Apparatus To Enhance Laser Printer Speed And Functionality.

SUMMARY OF THE INVENTION

The present invention has been made to overcome the above described problem of the related art. It is an object of the present invention to provide a technique for processing an ROM image when supplying of electrical power to a laser printer is interrupted during a down-loading of the ROM image, in which even if the ROM image is abnormally loaded in the flash memory due to the interruption of the supplying of electrical power, the ROM image is loaded to the flash memory again so that the laser printer can be normally operated.

To accomplish the above object of the present invention, according to the first aspect of the present invention, there is provided a technique for processing an ROM image when supplying of electrical power to a laser printer is interrupted, comprising the steps of:

detecting a check word in each program region of a flash memory in the laser printer;

checking whether or not the ROM image has been normally recorded in each program region based on the check word;

setting an operation mode of the laser printer to a normal mode when it has been determined that the ROM image has been normally recorded in each program region;

setting the operation mode of the laser printer to a down load mode when it has been determined that the ROM image has been abnormally recorded in each program region due to the interruption of supplying of electrical power to the laser during a down loading of the ROM image; and loading the ROM image into the flash memory according to states of the ROM image when the operation mode is set to the down load mode.

The check words are detected in the detecting step, the check words being respectively recorded on a first and last position of each program region and including a region starting check word indicating a start of the ROM image stored in the program region of the flash memory and a region ending check word indicating an end of the ROM image stored in the program region of the flash memory.

The states of the ROM image include a first state in which the supply of electrical power is off in the laser printer during the deletion of the program regions, a second state in which the supply of electrical power is off in the laser printer before all program regions are deleted and the ROM image copied to the flash memory, and a third state in which the supply of electrical power is off in the laser printer during the copying of the ROM image to the flash memory after all program regions have been deleted.

The ROM image loading step comprises the steps of: downloading the ROM image through a parallel port and storing the ROM image in a RAM; determining whether or not a header is included in the ROM image stored in the RAM; reading an ID of the header when the ROM image which is stored in the RAM includes the header; setting a table of changes for the flash memory according to the ID; checking whether or not the header is included in all regions of the ROM image stored in the RAM; and copying the ROM image to the flash memory according to the states of the ROM image when the detecting of the header is completed throughout all regions of the ROM image stored in the RAM in the checking step.

When the ROM image is presented in the first state in the flash memory, the ROM image which is stored in the corresponding sector of the flash memory is deleted according to the table of changes for the flash memory and the ROM image which is stored in the RAM is copied in the corresponding sector of the flash memory according to the table of changes for the flash memory.

When the ROM image is presented in the second state in the flash memory, the ROM image which is stored in the RAM is copied in the corresponding sector of the flash memory according to the table of changes for the flash memory.

When the ROM image is presented in the third state in the flash memory, the ROM image which is stored in the flash memory is deleted according to the table of changes for the flash memory and the ROM image which is stored in the RAM is copied to the corresponding sector of the flash memory according to the table of changes for the flash memory.

The table of changes for the flash memory has numbers of bits corresponding to numbers of sectors of the flash memory, which are respectively set to one when the sector of the flash memory corresponding to one of the bits is changed and to zero when the sector of the flash memory corresponding to one of the bits is unchanged.

The header includes two bytes of a header field which indicates that the ROM image is an image to be changed and one byte of an ID field which indicates a kind of image to be changed.

The steps are preferably performed by a program which is stored in a boot area of the flash memory.

The boot area is provided with a routine for detecting whether or not the ROM image is normally recorded in the program region, a transmitting driver for storing the ROM image in the RAM after receiving the ROM image which is transmitted through the parallel port, a RAM driver for setting the table of changes for the flash memory by reading the ID after it is determined whether or not the header is presented in the RAM, and a flash memory driver for copying the ROM image in the RAM to the corresponding sector of the flash memory after the ROM image is deleted from the corresponding sector of the flash memory according to the table of changes for the flash memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 show a table of changes for the flash memory to which the present invention is applied;

FIG. 9 is a flowchart showing steps of loading the ROM image in the flash memory according to the present invention.

DESCRIPTION OF THE PREFERRED EMBODIMENT

Hereinafter, a method for processing a ROM image when electrical power supplied to a laser printer is interrupted according to a preferred embodiment of the present invention will be described in detail with reference to the accompanying drawings.

Figure 1:
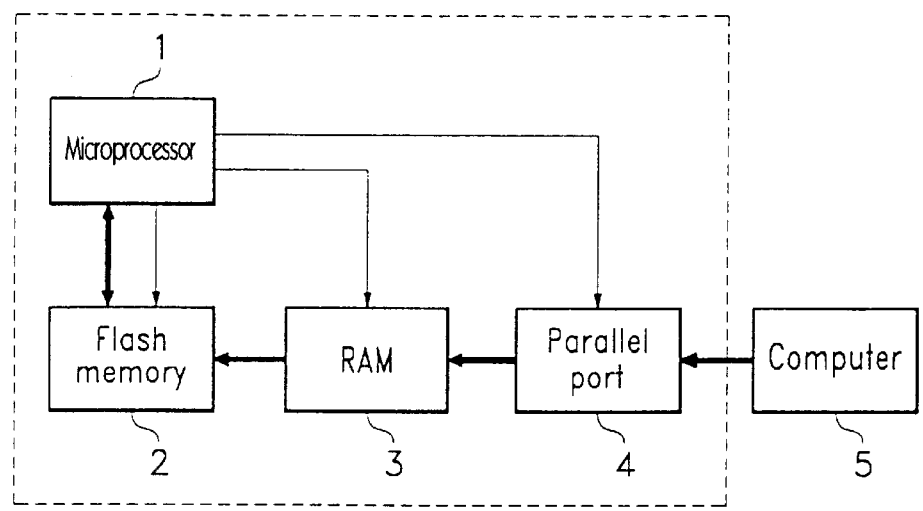
FIG. 1 is a schematic block diagram showing an apparatus for loading a ROM image into a laser printer to which a method of processing the ROM image according to the present invention is applied.

FIG. 1 is a block diagram schematically showing an apparatus for loading the ROM image into the laser printer which takes a flash memory to which the present invention is applied.

As shown in FIG. 1, the apparatus for loading the ROM image into the laser printer includes a microprocessor 1 for controlling a system according to an instruction of a desired program which is stored in the flash memory, the flash memory 2 having the ROM image, such as a bios and emulations stored therein to operate the microprocessor 1, a parallel port 4 through which the ROM image is loaded from a computer to the flash memory of the laser printer under the control of the microprocessor 1, and a RAM 3 in which the ROM image is temporarily stored.

Figure 2:
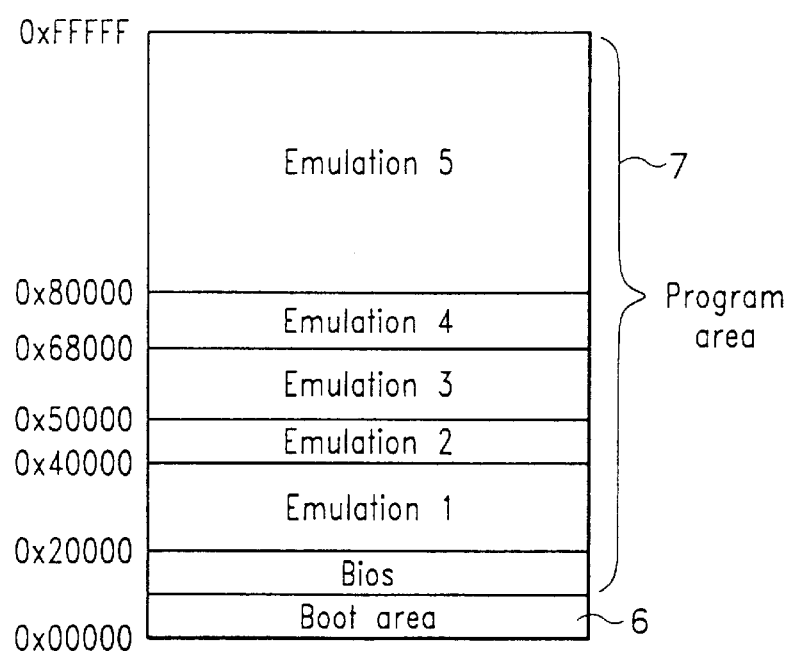
FIG. 2 shows a structure of a ROM map in a laser printer.

FIG. 2 shows a structure of a ROM map in the laser printer of FIG. 1. As shown in FIG. 2, the typical ROM in the laser printer has address areas which are arranged from a lower portion to an upper portion and includes a boot area 6 which is firstly performed when electrical power is supplied to the laser printer and a program area 7 having a bios as a program for controlling an overall operation of the laser printer and an emulation mode program for applying each emulation for the laser printer.

Figure 3:
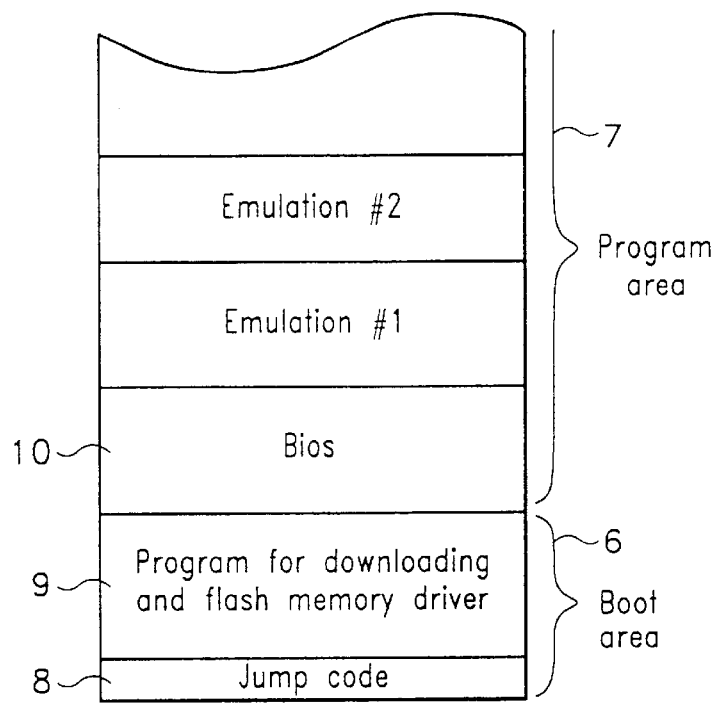
FIG. 3 shows a boot area of a ROM map in the laser printer of FIG. 2.
Figure 4:
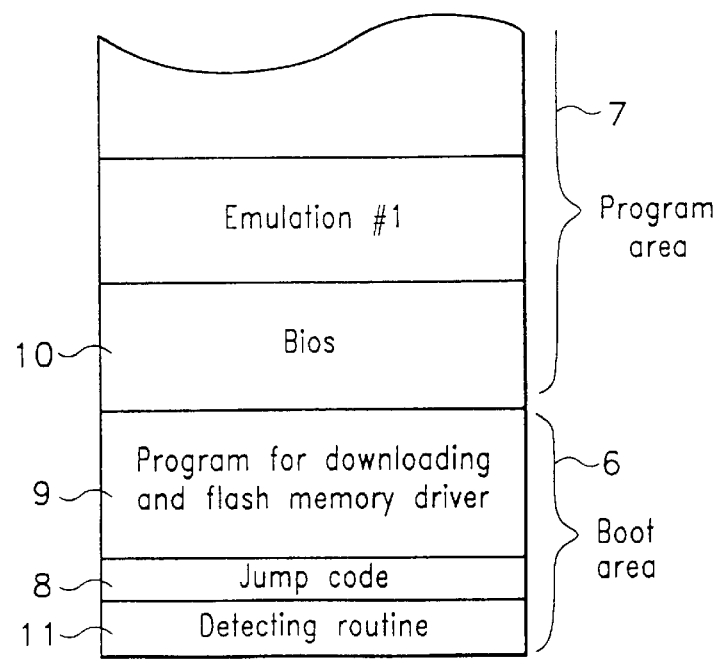
FIG. 4 shows a boot area of a ROM map in a laser printer to which the method of processing the ROM image according to the present invention is applied.

FIG. 3 shows a boot area of a ROM map in the laser printer of FIG. 2 and FIG. 4 shows a boot area of a ROM map in a laser printer to which the method of processing the ROM image according to the present invention is applied.

As shown in FIG. 3, the ROM map includes a boot area 6 which has a jump code 8 and a down load program 9 for loading the ROM image to the flash memory, and a program area 7 which has a bios 10 for controlling an overall operation of the laser printer and an emulation mode program for applying each emulation mode for the laser printer.

As shown in FIG. 4, the ROM map includes the same area as that of the ROM map in FIG. 3, except that the boot area thereof has a detecting routine 11.

With reference to FIG. 3, when electrical power is supplied for the laser printer, the microprocessor 1 reads a jump code 8 in the boot area 6 so as to determine whether the laser printer is presented either in a normal mode or in a down-loading mode. If the laser printer is in the normal mode, the microprocessor 1 reads the bios in the program region, while if the laser printer is in the down-loading mode, the microprocessor 1 reads a down-loading program in the boot area 6. On the other hand, an user may set a desired mode by pushing a specified button on the laser printer.

With reference to FIG. 4, according to the present invention, the detecting routine 11 is added to the flash memory before the sector of the jump code 8. The micro processor 1 determines whether the ROM bios and the emulation programs are normally recorded on each program area 7 in the flash memory 2 so as to set an operation mode of the laser printer.

Figure 5:
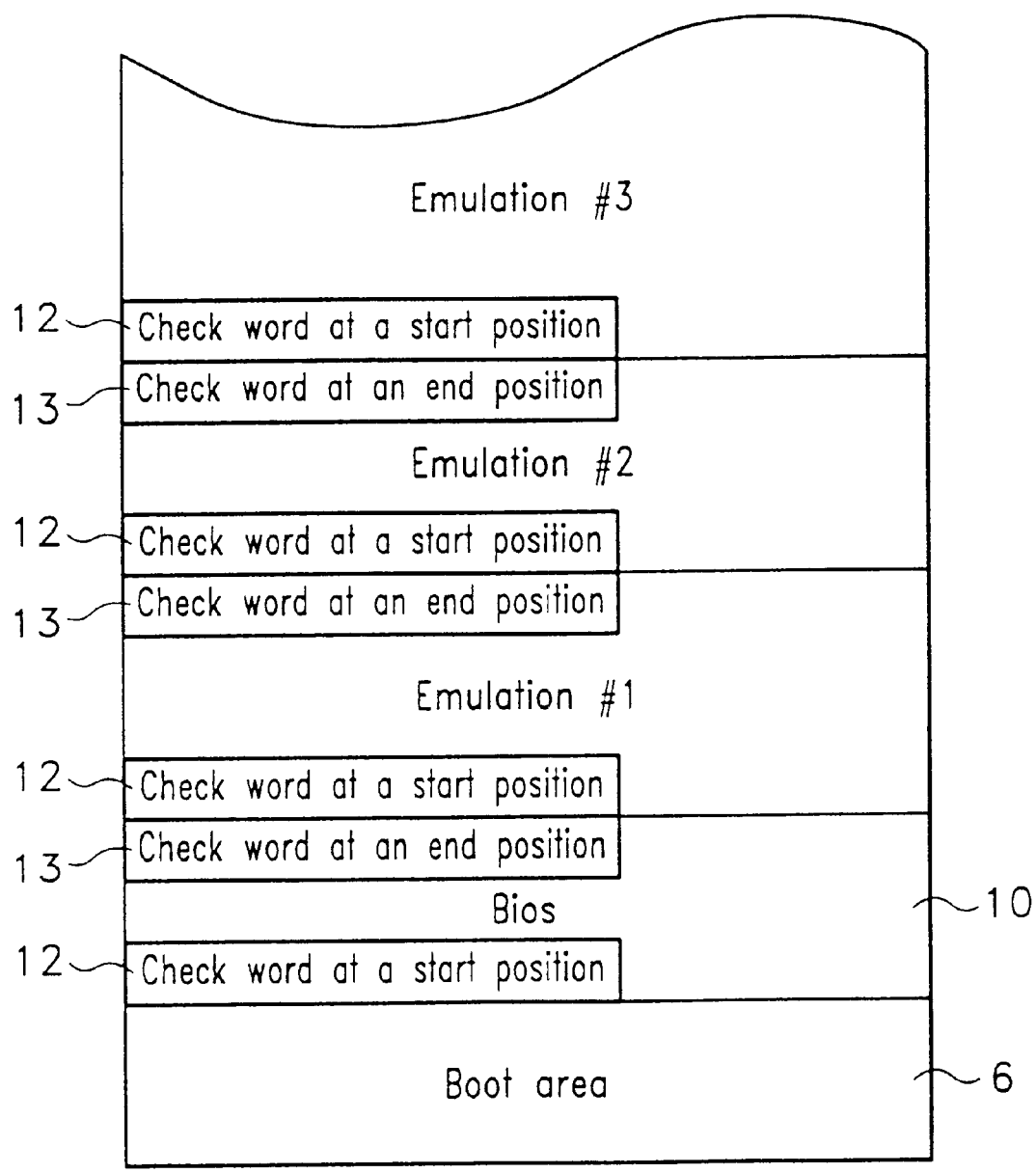
FIG. 5 shows a region starting check word and a region ending check word which are applied to the ROM image which is processed by the method according to the present invention.

On the other hand, FIG. 5 shows a region starting check word and a region ending check word which are applied to the ROM image which is processed by the method according to the present invention.

As shown in FIG. 5, the check words 12 and 13 respectively have area of two bytes at a start and an end of each program area 7 in which the ROM image is down-loaded. The check words 12 and 13 include an area starting check word 12 indicating the start of each program area 7 and an area ending check word 13 indicating the end of each program area 7. Each of the check words 12 and 13 has a specified value. Each of the check words 12 and 13 is limited to 55AA as a hexadecimal to help you to understand the present invention. Moreover, when the check words 12 and 13 are deleted in the flash memory 2, each check word 12 and 13 has a FFFF as the hexadecimal.

Figure 8:
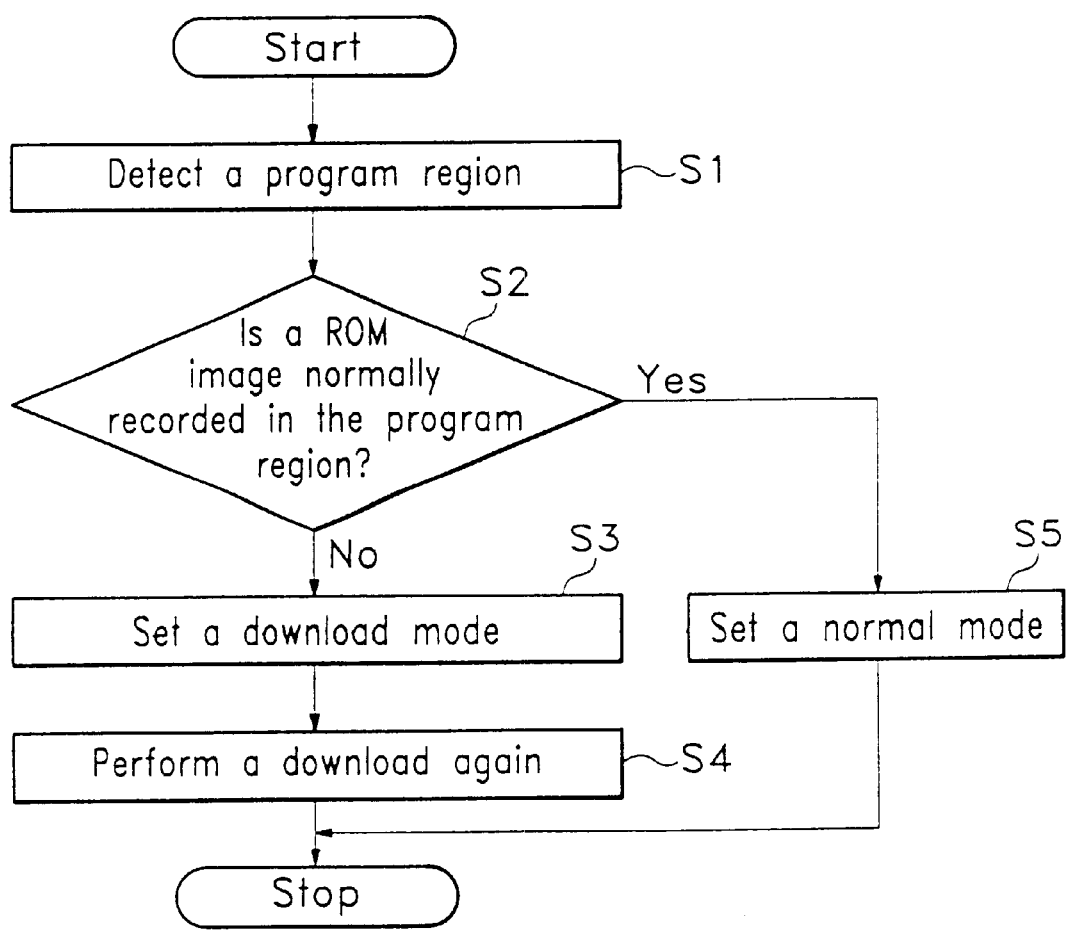
FIG. 8 is a flowchart showing a processing of the ROM image according to the present invention.

FIG. 8 is a flowchart showing a processing of the ROM image according to the present invention.

As shown in FIG. 8, when electrical power is supplied to the laser printer, the detecting routine 11 in the boot area 6 is performed. The detecting routine 11 detects the check words 12 and 13 throughout the program area 7 including the bios and the emulation programs in the flash memory 2 in step S1. Then, the detecting routine 11 checks whether the bios and the emulation programs are correctly recorded in the program area 7 in the step S2.

When it is determined that the ROM image is normally recorded on the all area of the flash memory 2, the laser printer is set into the normal mode in the step S5 and the microprocessor 1 reads the bios 10. On the other hand, when it is determined that the ROM image is abnormally recorded in the flash memory 2, the laser printer is set into the down-loading mode in the step S3, the down-loading of the ROM image is performed again in the step 4.

FIG. 9 is a flowchart showing steps of loading the ROM image to the flash memory according to the present invention.

As shown in FIG. 9, the microprocessor 1 receives the ROM image from the computer 5 through the parallel port 4 by using the down-loading program in the boot area 6 in step S6. The ROM image is stored in the RAM 3 by the flash memory driver in step S7.

Figure 6:
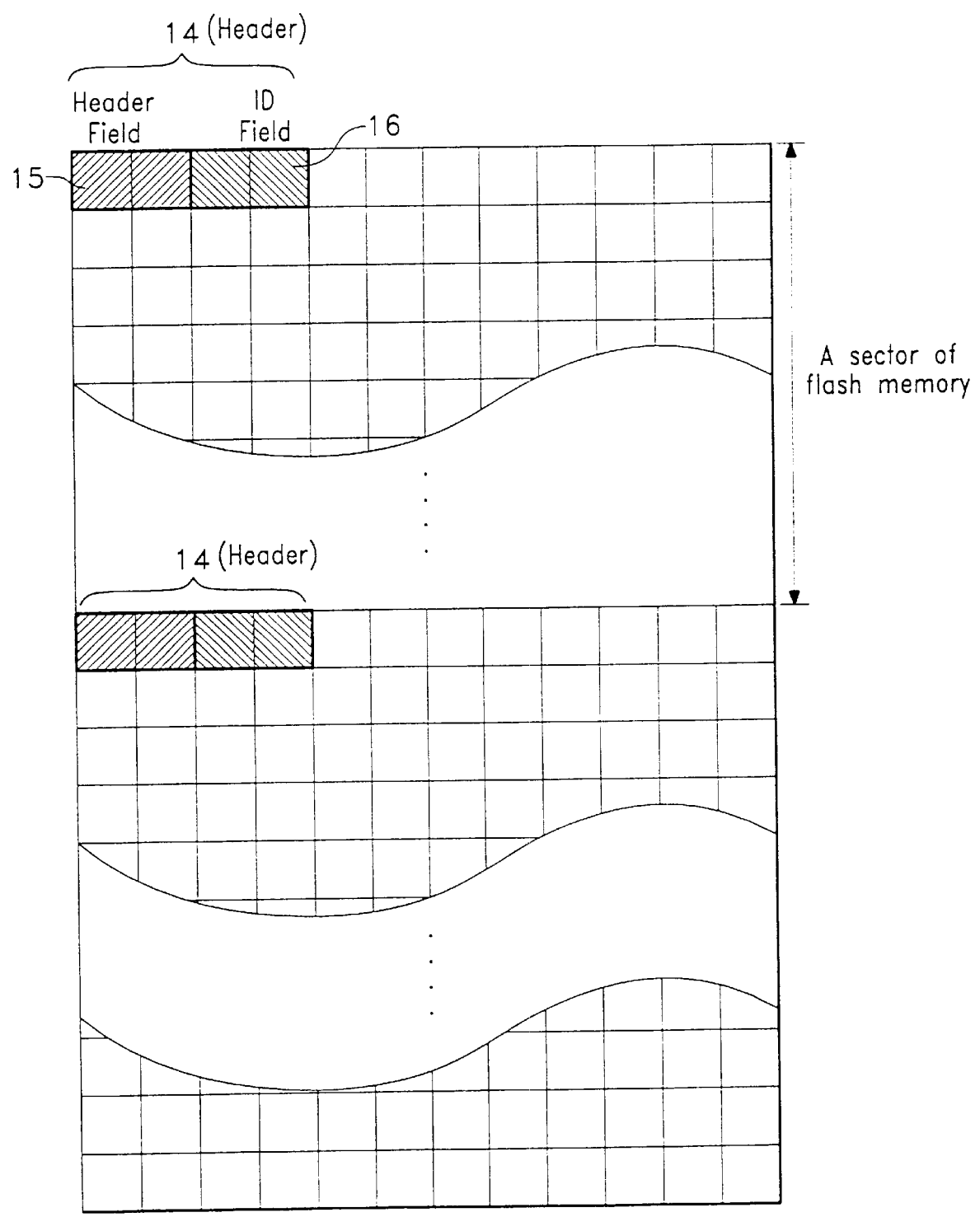
FIG. 6 shows a header of a flash memory to which the present invention is applied.

As shown in FIG. 6, the ROM image which is down-loaded in the RAM 3 has a header 14 which may be as much as one sector of the flash memory 2. The header 14 includes a header field 15 which is two bytes in size and indicates an image to be changed and an ID field 16 which is two bytes in size and indicates a type of the ROM image.

In step S8, a search is made for the header 14 which has a size corresponding to one sector of the flash memory 2 after the ROM image is down-loaded in the RAM 3. In step S9, when the header 9 is detected in step S8, the ID field 16 which is positioned after the header field 15 is read in the step S9.

The ID field 16 indicates whether the ROM image is either the bios image or any one image of the plurality of the emulation images. According to the ID field 16, the down-loaded program in the boot area 6 sets a beat of the sector to be changed into one beat in the flash memory changing table 17 as shown in FIG. 7, in step S10.

Then, in the step S11, the down-loaded program checks whether a detection of the header 14 in all regions of the RAM 3 has been completed. If the detecting of the header 14 is incomplete, steps S8 to S11 are repeatedly performed.

If the detecting of the header 14 in all regions of the RAM 3 has been completed, the image which is down-loaded in the RAM is copied in the flash memory 2 according to the flash memory changing table 17.

The region of the program which has errors is divided into three states in step S1 as detecting the program area of the flash memory. The copying operation according to the three states of the program region is as follows:

The first state: when the region ending check word 13 is 55AA or the region starting check word 12 is FFFF in the program region 7 which is detected, it indicates that the supplying of electrical power has been interrupted in the deletion step during the down-loading of the ROM image to the program region. The ROM image of the RAM 3 is copied to the program region after deleting the data in the program region, in step 14.

The second state: when the region starting check word 12 and the region ending check word 13 are FFFF, it indicates that the supplying of electrical power has been interrupted before the step of copying the ROM image in the RAM to the flash memory after the step of deleting the recorded data during the down-loading of the ROM image in the RAM to the flash memory. It is unnecessary to delete the program region. Accordingly, the ROM image in the RAM 3 is copied to the program region in the step S15.

The third state: when the region starting check word 12 is 55AA, but the region ending check word 13 is FFFF, it indicates that the supplying of electrical power has been interrupted in the step of copying the ROM image to the flash memory after deleting the recorded data in the program region during the down-loading of the ROM image to the program region. Therefore, the ROM image in the RAM 3 is copied to the program region in step S17 after the recorded data is deleted again in step S16.

Even though the ROM image is abnormally down-loaded to the flash memory 2 because the supplying of electrical power to the laser printer has been interrupted during the down-loading of the ROM image to the flash memory 2, the ROM image can be recorded in the flash memory 2 according to the present invention.

In the method of processing the ROM image when the supplying of electrical power has been interrupted, since the detecting routine is added to the boot area of the flash memory to detect whether the ROM image is normally recorded in the flash memory 2, the ROM image is reloaded to the flash memory 2 according to the determination of the detecting routine. Accordingly, a malfunction of the laser printer can be prevented.

Furthermore, since the method of processing the ROM image is provided even though the supplying of electrical power has been interrupted during the down-loading of the ROM image to the flash memory of the laser printer, a reliability of products can be raised and servicing costs can be reduced.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for processing a ROM image when supplying of electrical power to a laser printer has been interrupted, comprising the steps of:
   detecting a check word in each program region of a flash memory in the laser printer;
   checking whether or not the ROM image has been normally recorded in each program region based on the check word;
   setting an operation mode of the laser printer to a normal mode when it has been determined that the ROM image has been normally recorded in each program region;
   setting the operation mode of the laser printer to a down load mode when it has been determined that the ROM image has been abnormally recorded in each program region due to the interruption of supplying electrical power to the laser printer during a downloading of the ROM image; and
   loading the ROM image into the flash memory according to states of the ROM image when the operation mode is set to the downloading mode.

2. A method for processing a ROM image when supplying of electrical power to a laser printer has been interrupted as claimed in claim 1, the check words being detected in the detecting step, the check words being respectively recorded on a first and last position of each program region.

3. A method for processing a ROM image when supplying of electrical power to a laser printer has been interrupted as claimed in claim 2, the check words including a region starting check word indicating a start of the ROM image stored in the program region of the flash memory and a region ending check word indicating an end of the ROM image stored in the program region of the flash memory.

4. A method for processing a ROM image when supplying of electrical power to a laser printer being interrupted as claimed in claim 1, the states of the ROM image including a first state in which the supply of electrical power is off in the laser printer during the deletion of the program regions, a second state in which the supply of electrical power is off in the laser printer before all program regions are deleted and the ROM image is copied to the flash memory, and a third state the supply of electrical power is off in the laser printer during the copying of the ROM image to the flash memory after all program regions have been deleted.

5. A method for processing a ROM image when supplying of electrical power to a laser printer has been interrupted as claimed in claim 4, the ROM image loading step comprising the steps of:
   downloading the ROM image through a parallel port and storing the ROM image in a RAM;
   determining whether or not a header is included in the ROM image stored in the RAM;
   reading an ID of the header when the ROM image which is stored in the RAM includes the header;
   setting a table of changes for the flash memory according to the ID;
   checking whether or not the header is included in all regions of the ROM image stored in the RAM; and
   copying the ROM image to the flash memory according to the states of the ROM image when the detecting of the header has been completed throughout all regions of the ROM image stored in the RAM in the checking step.

6. A method for processing a ROM image when supplying of electrical power to a laser printer has been interrupted as claimed in claim 5, upon the ROM image being presented in the first state in the flash memory, the ROM image which is stored in the corresponding sector of the flash memory is deleted according to the table of changes for the flash memory and the ROM image which is stored in the RAM is copied to the corresponding sector of the flash memory according to the table of changes for the flash memory.

7. A method for processing a ROM image when supplying of electrical power to a laser printer has been interrupted as claimed in claim 5, upon the ROM image being presented in the second state in the flash memory, the ROM image which is stored in the RAM is copied to the corresponding sector of the flash memory according to the table of changes for the flash memory.

8. A method for processing a ROM image when supplying of electrical power to a laser printer has been interrupted as claimed in claim 5, upon the ROM image being presented in the third state in the flash memory, the ROM image which is stored in the flash memory is deleted according to the table of changes for the flash memory and the ROM image which is stored in the RAM is copied to the corresponding sector of the flash memory according to the table of changes for the flash memory.

9. A method for processing a ROM image when supplying of electrical power to a laser printer has been interrupted as claimed in claim 5, the table of the changes for the flash memory having numbers of bits corresponding to numbers of sectors of the flash memory, which are respectively set to one when the sector of the flash memory corresponding to one of the bits is changed and to zero when the sector of the flash memory corresponding to one of the bits is unchanged.

10. A method for processing a ROM image when supplying of electrical power to a laser printer has been interrupted as claimed in claim 5, the header including two bytes of a header field which indicates that the ROM image is an image to be changed and one byte of an ID field which indicates a kind of the ROM image to be changed.

11. A method for processing a ROM image when supplying of electrical power to a laser printer has been interrupted as claimed in claim 1, the steps being performed by a program which is stored in a boot area of the flash memory.

12. A method for processing a ROM image when supplying of electrical power to a laser printer has been interrupted as claimed in claim 5, the steps being performed by a program which is stored in a boot area of the flash memory.

13. A method for processing a ROM image when supplying of electrical power to a laser printer has been interrupted as claimed in claim 11, the boot area being provided with a routine for detecting whether or not the ROM image is normally recorded in the program regions, a transmitting driver for storing the ROM image in the RAM after receiving the ROM image which is transmitted through the parallel port, a RAM driver for setting the table of the changes for the flash memory by reading the ID after it has been determined that the header is presented in the RAM, and a flash memory driver for copying the ROM image in the RAM to the corresponding sector of the flash memory after the ROM image is deleted from the corresponding sector of the flash memory according to the table of the changes for the flash memory.

14. A method for processing a ROM image when supplying of electrical power to a laser printer has been interrupted as claimed in claim 12, the boot area being provided with a routine for detecting whether or not the ROM image is normally recorded in the program regions, a transmitting driver for storing the ROM image in the RAM after receiving the ROM image which is transmitted through the parallel port, a RAM driver for setting the table of the changes for the flash memory by reading the ID after it has been determined that the header is presented in the RAM, and a flash memory driver for copying the ROM image in the RAM to the corresponding sector of the flash memory after the ROM image is deleted from the corresponding sector of the flash memory according to the table of the changes for the flash memory.

15. An apparatus for processing a ROM image when supplying of electrical power to a laser printer has been interrupted, comprising:

a detector for detecting a check word in each program region of a flash memory in the laser printer;

a checking means for checking whether or not the ROM image has been normally recorded in each program region based on the check word;

a setting means for setting an operation mode of the laser printer to a normal mode when it has been determined that the ROM image has been normally recorded in each program region;

said setting means setting the operation mode of the laser printer to a down load mode when it has been determined that the ROM image has been abnormally recorded in each program region due to the interruption of supplying electrical power to the laser printer during a downloading of the ROM image; and a loading means for loading the ROM image into the flash memory according to states of the ROM image when the operation mode is set to the downloading mode.

16. The apparatus for processing a ROM image when supplying of electrical power to a laser printer has been interrupted as claimed in claim 15, the check words being detected by the detector, the check words being respectively recorded on a first and last position of each program region.

17. The apparatus for processing a ROM image when supplying of electrical power to a laser printer has been interrupted as claimed in claim 16, the check words including a region starting check word indicating a start of the ROM image stored in the program region of the flash memory and a region ending check word indicating an end of the ROM image stored in the program region of the flash memory.

18. The apparatus for processing a ROM image when supplying of electrical power to a laser printer being interrupted as claimed in claim 15, the states of the ROM image including a first state in which the supply of electrical power is off in the laser printer during the deletion of the program regions, a second state in which the supply of electrical power is off in the laser printer before all program regions are deleted and the ROM image is copied to the flash memory, and a third state the supply of electrical power is off in the laser printer during the copying of the ROM image to the flash memory after all program regions have been deleted.

19. The apparatus for processing a ROM image when supplying of electrical power to a laser printer has been interrupted as claimed in claim 18, the loading means comprising means for:

downloading the ROM image through a parallel port and storing the ROM image in a RAM;

determining whether or not a header is included in the ROM image stored in the RAM;

reading an ID of the header when the ROM image which is stored in the RAM includes the header;

setting a table of changes for the flash memory according to the ID;

checking whether or not the header is included in all regions of the ROM image stored in the RAM; and copying the ROM image to the flash memory according to the states of the ROM image when the detecting of the header has been completed throughout all regions of the ROM image stored in the RAM in the checking step.

20. The apparatus for processing a ROM image when supplying of electrical power to a laser printer has been interrupted as claimed in claim 19, upon the ROM image being presented in the first state in the flash memory, the ROM image which is stored in the corresponding sector of the flash memory is deleted according to the table of changes for the flash memory and the ROM image which is stored in the RAM is copied to the corresponding sector of the flash memory according to the table of changes for the flash memory.

21. The apparatus for processing a ROM image when supplying of electrical power to a laser printer has been interrupted as claimed in claim 19, upon the ROM image being presented in the second state in the flash memory, the ROM image which is stored in the RAM is copied to the corresponding sector of the flash memory according to the table of changes for the flash memory.

22. The apparatus for processing a ROM image when supplying of electrical power to a laser printer has been interrupted as claimed in claim 19, upon the ROM image being presented in the third state in the flash memory, the ROM image which is stored in the flash memory is deleted according to the table of changes for the flash memory and the ROM image which is stored in the RAM is copied to the corresponding sector of the flash memory according to the table of changes for the flash memory.

23. The apparatus for processing a ROM image when supplying of electrical power to a laser printer has been interrupted as claimed in claim 19, the table of the changes for the flash memory having numbers of bits corresponding to numbers of sectors of the flash memory, which are respectively set to one when the sector of the flash memory corresponding to one of the bits is changed and to zero when the sector of the flash memory corresponding to one of the bits is unchanged.

24. The apparatus for processing a ROM image when supplying of electrical power to a laser printer has been interrupted as claimed in claim 19, the header including two bytes of a header field which indicates that the ROM image is an image to be changed and one byte of an ID field which indicates a kind of the ROM image to be changed.

25. The apparatus for processing a ROM image when supplying of electrical power to a laser printer has been interrupted as claimed in claim 15, the detector, checking means, setting means, and loading means operating in response to a program which is stored in a boot area of the flash memory.

26. The apparatus for processing a ROM image when supplying of electrical power to a laser printer has been interrupted as claimed in claim 19, the detector, checking means, setting means, and loading means operating in response to a program which is stored in a boot area of the flash memory.

27. The apparatus for processing a ROM image when supplying of electrical power to a laser printer has been interrupted as claimed in claim 25, the boot area being provided with a routine for detecting whether or not the ROM image is normally recorded in the program regions, a transmitting driver for storing the ROM image in the RAM after receiving the ROM image which is transmitted through the parallel port, a RAM driver for setting the table of the changes for the flash memory by reading the ID after it has been determined that the header is presented in the RAM, and a flash memory driver for copying the ROM image in the RAM to the corresponding sector of the flash memory after the ROM image is deleted from the corresponding sector of the flash memory according to the table of the changes for the flash memory.

28. The apparatus for processing a ROM image when supplying of electrical power to a laser printer has been interrupted as claimed in claim 26, the boot area being provided with a routine for detecting whether or not the ROM image is normally recorded in the program regions, a transmitting driver for storing the ROM image in the RAM after receiving the ROM image which is transmitted through the parallel port, a RAM driver for setting the table of the changes for the flash memory by reading the ID after it has been determined that the header is presented in the RAM, and a flash memory driver for copying the ROM image in the RAM to the corresponding sector of the flash memory after the ROM image is deleted from the corresponding sector of the flash memory according to the table of the changes for the flash memory.

* * * * *